United States Patent [19]

Iijima

[11] Patent Number: 5,349,649

[45] Date of Patent: Sep. 20, 1994

[54] PORTABLE ELECTRONIC DEVICE SUPPORTING MULTI-PROTOCOLS

[75] Inventor: Yasuo Iijima, Yokohama, Japan

[73] Assignee: Kabushiki Kaisha Toshiba, Kawasaki, Japan

[21] Appl. No.: 860,180

[22] Filed: Mar. 30, 1992

[30] Foreign Application Priority Data

Apr. 22, 1991 [JP] Japan .................... 3-090173

[51] Int. Cl.$^5$ ............................................. G06F 15/02
[52] U.S. Cl. ..................................... 395/275; 395/200
[58] Field of Search ..................... 395/200, 275, 725; 364/240.8, 241.3, 200, 900

[56] References Cited

U.S. PATENT DOCUMENTS

| 4,766,534 | 8/1988 | DeBenedictis | 364/200 |
|---|---|---|---|
| 4,855,905 | 8/1989 | Estrada et al. | 364/200 |
| 4,891,783 | 1/1990 | Aritaka et al. | 364/900 |
| 5,136,716 | 8/1992 | Harvey et al. | 395/800 |
| 5,191,653 | 3/1993 | Banks et al. | 395/275 |
| 5,237,693 | 8/1993 | Kiyohara et al. | 395/725 |
| 5,245,703 | 9/1993 | Hubert | 395/200 |
| 5,278,972 | 1/1994 | Baker et al. | 395/500 |

FOREIGN PATENT DOCUMENTS

| 0202622 | 11/1986 | European Pat. Off. . |
| 2612316 | 9/1988 | France . |
| 62-130040 | 6/1987 | Japan . |
| 63-250726 | 10/1988 | Japan . |

OTHER PUBLICATIONS

ISO/IEC DIS 7816-3 pp. 1-24.

Primary Examiner—Dale M. Shaw
Assistant Examiner—Moustafa M. Meky
Attorney, Agent, or Firm—Cushman, Darby & Cushman

[57] ABSTRACT

A portable electronic device includes a storing unit for storing different types of communication protocols, a priority order setting unit for setting a priority order for the different types of communication protocols stored in the storing unit, a selecting unit for selecting a predetermined communication protocol from the different types of communication protocols on the basis of the priority order set by the priority order setting unit, and a communicating unit for performing communication using the predetermined communication protocol selected by the selecting unit.

17 Claims, 5 Drawing Sheets

PORTABLE ELECTRONIC DEVICE SUPPORTING MULTI-PROTOCOLS

BACKGROUND OF THE INVENTION

1. Field of the Invention

The present invention relates to a portable electronic device such as an IC card having a function of supporting two or more communication protocols.

2. Description of the Related Art

An IC card is available as a conventional portable recording medium. This IC card comprises a ROM for storing control programs, a data memory for storing various types of data, a CPU for performing various control operations on the basis of the control programs stored in the ROM, and contacts brought into electrical contact with an external device to exchange data therewith. A communication protocol for performing data communication with the external device is stored in the ROM.

In recent years, IC cards are used in a variety of applications. The IC cards must exchange data with various external devices such as bank terminals and credit terminals at different positions. For this reason, a plurality of communication protocols are prepared in advance, and a desired communication protocol is appropriately selected. Demand has arisen for an IC card capable of accurately performing communication with external devices having different types of communication protocols.

In a system including this IC card and external devices, a desired communication protocol used at the time of data communication in the system must be selected and designated at the start time of the system. In any case, even a frequently used communication protocol cannot be used without performing predetermined procedures for designating the communication protocol.

As described above, in a conventional portable electronic device compatible with a plurality of protocols, a user must designate a communication protocol prior to data communication. Data communication cannot therefore be started at the start time of the system, resulting in inconvenience.

SUMMARY OF THE INVENTION

It is, therefore, an object of the present invention to provide a portable electronic device compatible with a plurality of protocols and capable of starting data communication at the start time of a system.

In order to achieve the above object of the present invention, there is provided a portable electronic device comprising means for storing different types of communication protocols, priority order setting means for setting a priority order for the different types of communication protocols stored in the storing means, means for selecting a predetermined communication protocol from the different types of communication protocols on the basis of the priority order set by the priority order setting means, and communicating means for performing communication using the predetermined communication protocol selected by the selecting means.

A priority order is preset for the plurality of communication protocols stored in the storing means of the electronic portable device. At the start time of a system, a communication protocol having the highest priority is automatically selected. Consequently, when the communication protocol having the highest priority is used, data communication can be started simultaneously with the start of the system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An IC card according to an embodiment of the present invention will be described below with reference to the accompanying drawings.

An internal arrangement of IC card 1 according to this embodiment will be described with reference to FIG. 1. IC card 1 incorporates mask ROM 2 for storing control programs, data memory 3 constituted by an EEPROM and/or a battery backed-up RAM for storing various types of data, CPU 4 for performing various control operations on the basis of the contents of the control programs in mask ROM 2, contact portion 5 brought into electrical contact with external device 7 such as a reader/writer to perform data exchange with external device 7, and communication I/O circuit 6 for communicating with external device 7 with a predetermined communication protocol at a predetermined baud rate.

Two different protocols A and B for performing communication are stored in mask ROM 2. When IC card 1 is to communicate with external device 7, CPU 4 performs communication control in accordance with protocol A or B stored in mask ROM 2. RAM 40 is incorporated in CPU 4.

An operation for causing IC card 1 to perform data communication with external device (reader/writer) 7 will be described with reference to FIGS. 2A to 5.

Figure 2A:
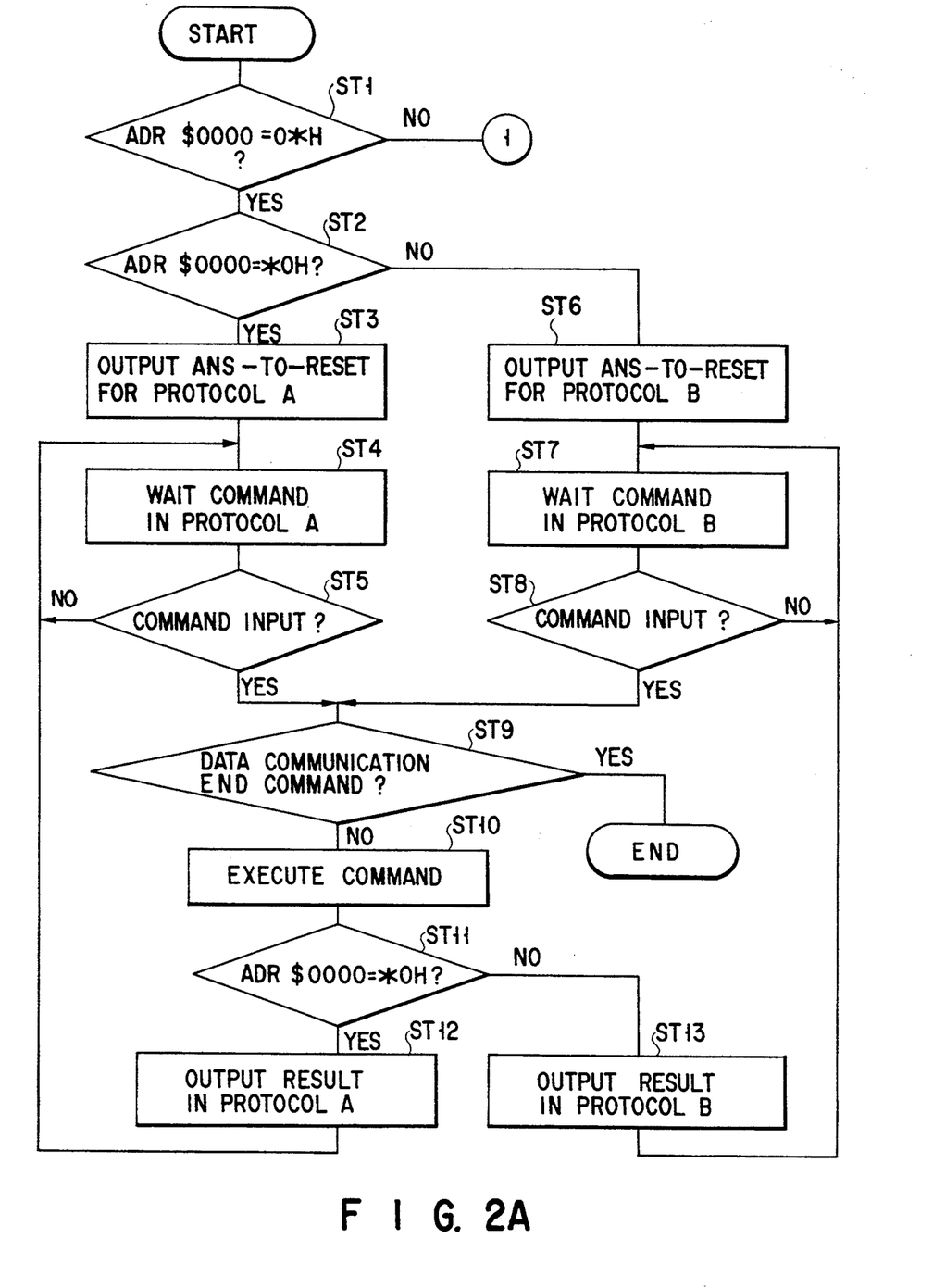
FIGS. 2A and 2B are flow charts for explaining processing flows for performing data communication with the IC card shown in FIG. 1.

CPU 4 reads out data at address $0000 of data memory 3 to determine whether the upper nibble of this readout data is $0_H$ (step ST1) where "H" indicate hexadecimal notation. An asterisk of 0*H in step ST1 indicates a wildcard character which can be substituted with an arbitrary number.

If the upper nibble of address $0000 is $0_H$, CPU 4 determines that IC card 1 supports only protocol A or B (to be referred to as case 1 hereinafter), and processing starting from step ST2 to be described later is performed.

Figure 2B:
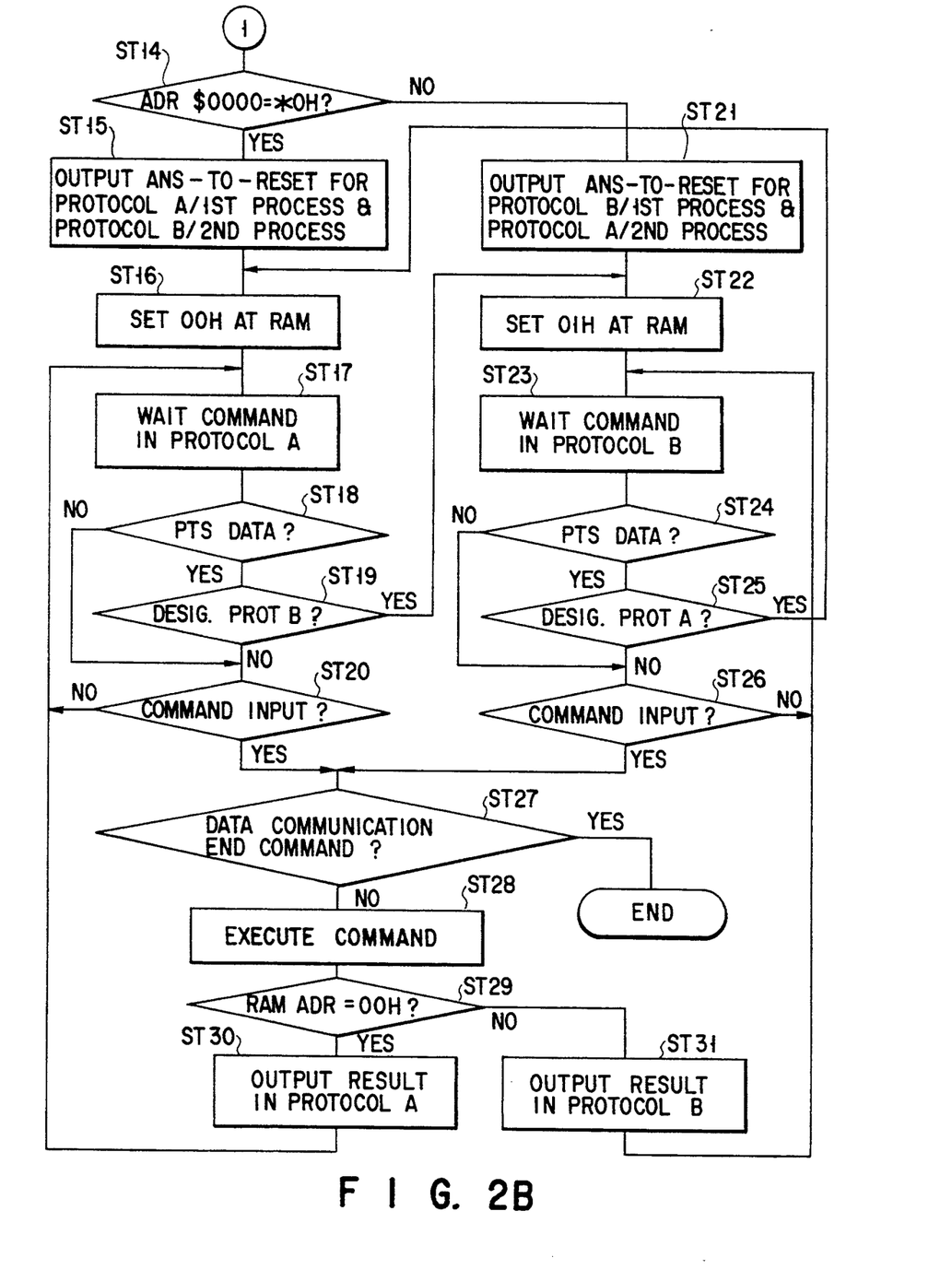

If the upper nibble of the data at address $0000 of data memory 3 is a value except for $0_H$, CPU 4 determines that IC card 1 supports two different protocols A and B and that protocol A or B can be designated by an external device (to be referred to as case 2 hereinafter). In this case, processing starting from step ST14 to be described later is performed.

Note that an address in step ST1 may be any value other than $0000 and may be exemplified by $FFFF. In this case, F*H is checked in step ST1, and *FH is checked in step ST2 or ST14.

Processing under the condition that IC card 1 supports either protocol A or B, i.e., case 1, will be described with reference to FIG. 2A. IC card 1 receives a power and a clock signal from external device 7 and is controlled by CPU 4.

Prior to data communication, a reset signal is supplied from external device 7 to CPU 4. When this reset signal is disabled, initial data called "Answer to Reset" (ANS-TO-RESET) is output from CPU 4 in IC card 1 to external device 7. The "Answer to Reset" information includes data defining the type of communication protocol supported by IC card 1. External device 7 receives "Answer to Reset" information and checks the communication protocol used with IC card 1 (cf. ISO/IEC DIS 7816-3).

Figure 3:
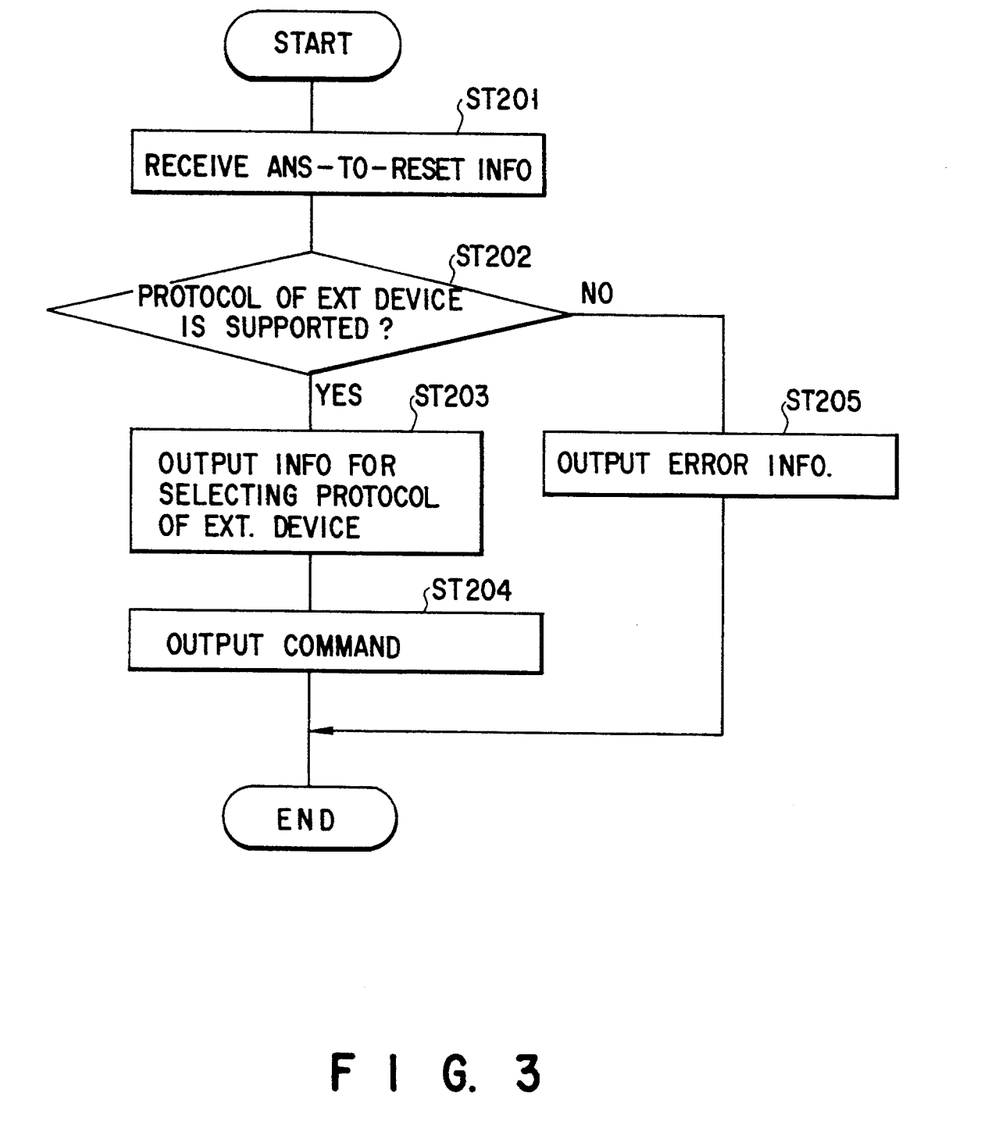
FIG. 3 is a flow chart for explaining an operation of an external device shown in FIG. 1.

FIG. 3 is a flow chart for explaining how external device 7 communicates with IC card 1.

when the "Answer to Reset" information is output from IC card 1 (steps ST3 and ST6 in FIG. 2A or steps ST15 and ST21 in FIG. 2B), external device 7 receives this "Answer to Reset" information (step ST201). A protocol used until the "Answer to Reset" information is output is standardized in accordance with ISO standards. This "Answer to Reset" information includes data representing the protocol supported by IC card 1.

External device (e.g., a bank terminal or a credit terminal) 7 supports one protocol. A CPU (not shown) in external device 7 checks (step ST202) on the basis of the input "Answer to Reset" information whether its own protocol is supported by IC card 1.

If the protocol of external device 7 is supported by IC card 1 (YES in step ST202), external device 7 outputs information for selecting its own protocol (step ST203) and then outputs various commands to IC card 1 (step ST204). If the protocol of external device 7 is not supported by IC card 1 (NO in step ST202), error information is output (step ST205).

That is, on the basis of protocol selection information from external device 7, IC card 1 sends "Answer to Reset" information including the data representing the protocol supported by this IC card 1. Therefore, one of the plurality of protocols supported by this IC card is selected by external device 7.

Figure 1:
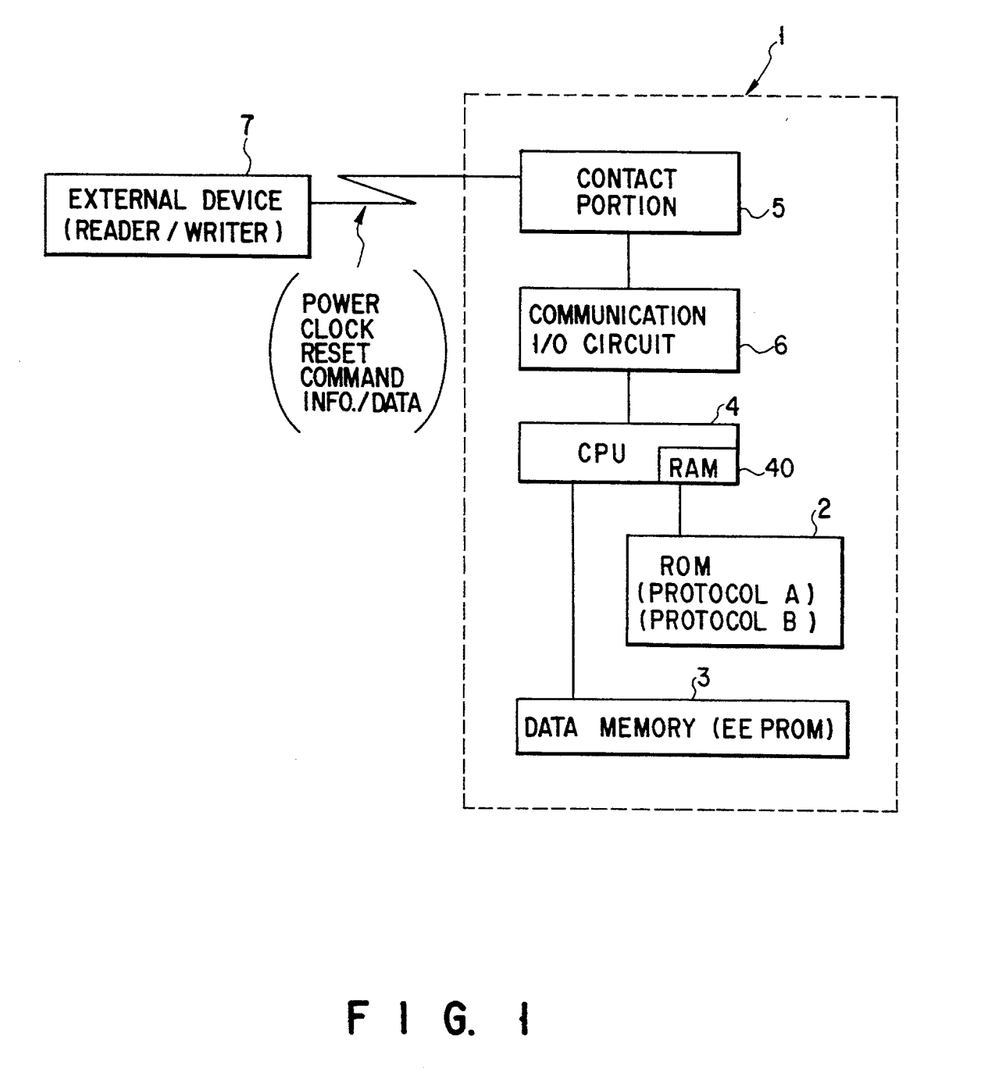
FIG. 1 is a block diagram showing an internal arrangement of an IC card according to an embodiment of the present invention.

IC card 1 can correspond to different types of protocols supported by different types of external devices 7 in the arrangement of FIG. 1 and the processing operations of FIGS. 2A and 2B. Each external device 7 automatically switches and selects one of the protocols from IC card 1 which supports multi-protocols.

Protocol switching is mainly assumed as switching between the IC card protocol and basic procedures of processing performed using an IC card. A semiduplex block transmission scheme is used as the IC card protocol.

Referring back to FIG. 2A, CPU 4 in IC card 1 reads out data at address $0000 of data memory 3 before CPU 4 outputs the "Answer to Reset" information to external device 7. After CPU 4 determines (step ST1) that the upper nibble of the data is 0H, CPU 4 determines (step ST2) whether the lower nibble of the data is $0_H$.

If the lower nibble of address $0000 is set to be $0_H$, CPU 4 outputs the "Answer to Reset" information representing that the "communication protocol is protocol A" (step ST3). In protocol A, control transits to a state for waiting a command from external device 7 (step ST4). The command waiting state is maintained in protocol A until any command input is entered (step ST5).

If the lower nibble at address $0000 is any value other than $0_H$ in step ST2, CPU 4 outputs the "Answer to Reset" information representing that the "communication protocol is protocol B" (step ST6). CPU 4 is then set in an external command waiting state in protocol B (step ST7). In this case, CPU 4 continues the command waiting state in protocol B until any command input is entered (step ST8).

when CPU 4 receives a command (cf. step ST204 in FIG. 3) from external device 7, CPU 4 determines (step ST9) whether this command is a data communication end command. If this command is determined not to be a data communication end command, processing corresponding to the determined command is performed (step ST10). CPU 4 checks the value of address $0000 in data memory 3 to check if the lower nibble of the data is $0_H$ (step ST11).

If the lower nibble of address $0000 is $0_H$ in step ST11, a processing result is output to the external device in protocol A (ST12), and CPU 4 returns to the command waiting state in protocol A in step ST3 described above. If the lower nibble of address $0000 is a value other than $0_H$ in step ST11, a processing result is output to the external device in protocol B (step ST13). CPU 4 then returns to the command waiting state in protocol B in step ST6.

In step ST9, if the received command is the data communication end command, CPU 4 ends data communication processing.

Data communication processing of IC card 1 under the condition that IC card 1 supports two different communication protocols and one of them can be designated by the external device, i.e., case 2, will be described with reference to FIG. 2B.

IC card 1 receives external power and an external clock signal to set CPU 4 operative, as described above. After the reset signal is disabled, CPU 4 reads out data at address $0000 and determines (step ST1) whether the upper nibble of the data at address $0000 is any value other than $0_H$. CPU 4 determines (step ST14) whether the lower nibble of the data is $0_H$.

In this case, if the lower nibble of the data at address $0000 is $0_H$, CPU 4 outputs "Answer to Reset" information representing protocol A as a protocol having the first priority (to be referred to as the first protocol hereinafter) and protocol B as a protocol having the second priority (to be referred to as the second protocol hereinafter) to external device 7 (step ST15). Data "00H" is stored at a specific address of RAM 40 in CPU 4 (step ST16), and CPU 4 is set in protocol A in a state for receiving a command from the external device (step ST17).

When CPU 4 receives any data in the command waiting state in protocol A, CPU 4 determines (step ST18) whether the input data is PTS (Protocol Type Selection) data for selecting a communication protocol.

If the received data is the protocol type selection data (PTS data), CPU 4 determines (step ST19) whether the PTS data is data for designating protocol B. If so, data "01H" is stored at a specific address of the RAM in CPU 4 (step ST22), and CPU 4 is set in a command waiting state with protocol B in step ST23 (to be described later).

If the received data is not PTS data in step ST18 or the PTS data is not the PTS data for designating protocol B in step ST19, CPU 4 determines (step ST20) whether the received data is a command. If NO in step ST20, CPU 4 is set in a command waiting state in protocol A (step ST17).

In step ST14, if the lower nibble of the data at address $0000 is a value other than $0_H$, CPU 4 outputs to external device 7 "Answer to Reset" information representing protocol B as the first protocol and protocol A as the second protocol (step ST21), and data "01H" is stored at a specific address of the RAM in CPU 4 (step ST22). CPU 4 is then set in an external command waiting state in protocol B (step ST23).

When CPU 4 receives any data in the command waiting state in protocol B, CPU 4 determines (step ST24) whether the data is protocol type selection data (PTS data). If the received data is determined to be PTS data, CPU 4 determines (step ST25) whether the PTS data is data for designating protocol A. If YES in step ST9.5, data "$00_H$"is stored at a specific address of RAM 40 in CPU 4 (step ST16). CPU 4 is set in the command waiting state in protocol A in step ST17 described above.

If the received data is not PTS data in step ST24 or the PTS data is not PTS data for designating protocol A in step ST25, CPU 4 determines (step ST26) whether the subsequently received data is a command. If NO in step ST26, CPU 4 is set in the command waiting state in protocol B again (step ST23).

When CPU 4 determines in steps ST20 and ST26 that the data received from external device 7 is a command, CPU 4 determines (step ST27) whether the command is a data communication end command. If NO in step ST27, processing of this command is performed (step ST28). The content of the specific address of RAM 40 incorporated in CPU 4 is checked (step ST29).

If the content of the specific address of RAM 40 is $00_H$, a command processing result is output in protocol A (step ST30). CPU 4 is set in the command waiting state in protocol A in step ST17 described above. If the content of the specific address of RAM 40 is not $00_H$, a command processing result is output in protocol B (step ST31). CPU 4 is then set in the command waiting state in protocol B in step ST23 described above.

If CPU 4 determines in step ST27 that the received command is a data communication end command, data communication processing is ended.

A communication baud rate (9,600 bps, 4,800 bps, or 1,200 bps) with external device 7 can be set simultaneously when a protocol is set in steps ST4, ST7, ST15, and ST21.

Hardware of a variable baud rate (multi-baud rate) can be performed by changing the frequency of a communication clock in I/O circuit 6.

When data communication is to be performed between IC card 1 and external device 7, CPU 4 in IC card 1 refers to the data content at address $0000 of data memory 3 as initial data (step ST1) and determines whether protocol A or B is used in data communication on the basis of the initial data. In order to change the communication protocol, the initial data (0*H) in memory 3 must be updated. This processing will be described with reference to FIG. 4.

Figure 4:
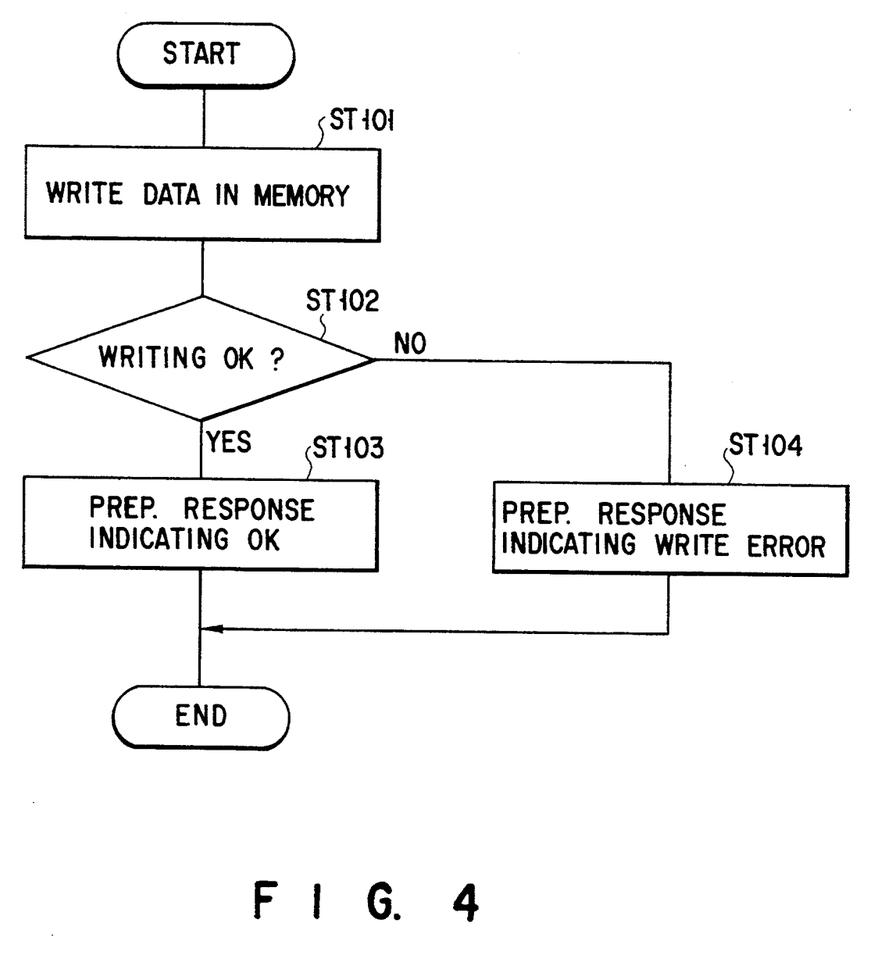
FIG. 4 is a flow chart for explaining a processing flow for updating initial data in the IC card shown in FIG. 1.
Figure 5:
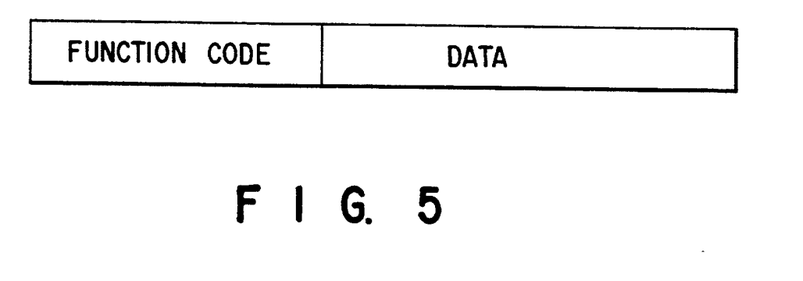
FIG. 5 is a view showing a format of an initial data updating command.

In order to update the initial data, an initial data updating command having a format shown in FIG. 5 is sent from external device 7 to CPU 4 in IC card 1. This command consists of function code FC representing that a change is to be made in initial data, and data DA to be updated. When CPU 4 in IC card 1 receives this command, data DA is written at address $0000 of data memory 3 (step ST101) and checks (step ST102) whether the data is properly written. If YES in step ST102, a response indicating OK is generated (step ST103). Otherwise, a response indicating a write error is generated (step ST104).

The generated response is output to external device 7 in accordance with processing result output processing (step ST12 or ST13 in case 1 and step ST30 or ST31 in case 2). By using this command, for example, the communication protocol (A or B) supported by IC card 1 can be changed from external device 7 even in case 1.

As described above, IC card 1 of this embodiment can change the communication protocol from the side of external device 7 in accordance with the specifications of external device 7 which performs data communication. Accurate data communication can be performed with external devices 7 having different types of communication protocol. Therefore, versatility of the IC card can be improved, and a system using an IC card can be flexibly arranged.

Selection or switching of a baud rate and/or a communication protocol can be performed by external device 7. Even if a plurality of terminals having different communication protocols and baud rates are connected to each other and data is exchanged therebetween, accurate data communication can be performed by switching to a proper communication protocol and a proper baud rate.

Assuming that a plurality of communication protocols can be supported (NO in steps ST1 in FIG. 2A; FIG. 2B), a priority order is given to these plurality of protocols (A and B) and a communication protocol (e.g., A) having a higher priority can be selected by default. For example, if communication protocol A which is more frequently used has a higher priority (i.e., protocol A has a higher priority if $0000=*0H in step ST4 of FIG. 2B), data communication can be automatically performed in communication protocol A, which is more frequently used, at the start time of the system.

IC card 1 of this embodiment may support a plurality of protocols (A and B) or only one communication protocol (either A or B). Even if IC card 1 is set to support only one communication protocol (YES in step ST1 of FIG. 2A), the type of communication protocol (A or B) can be changed by the procedures in FIG. 4. An IC card which is used for only one terminal can be set to support only one communication protocol (e.g., only protocol A) for this terminal.

In addition, various setup operations and changes can be very easily performed by only updating the content of address $0000 of data memory 3 from external device 7 in accordance with the procedures in FIG. 3.

The number of types of communication protocols supported by an IC card is not limited to two. An IC card can have three or more communication protocols, and these protocols can be appropriately selected and used.

The portable electronic apparatus of the present invention, as has been described above, can automatically select a communication protocol (A) having the highest priority at the start time of the IC card under the condition that a priority order (A>B) is set for a plurality of communication protocols stored in storing means (2). For this reason, when data communication is performed using the communication protocol (A) having the highest priority, data communication can be started simultaneously when the system is started.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable electronic device connectable to an external device, said portable electronic device comprising:
   first storing means for storing software programs respectively using different communication protocols;
   second storing means for storing prescribed information, said prescribed information serving to discriminate a specific protocol which is to be used when communication is started with said external device;
   third storing means, coupled with said first and second storing means, for storing said specific protocol when communication is started;
   communication means for communicating with said external device based on one of said software programs stored in said first storing means, said software program corresponding to said specific protocol stored in said third storing means; and
   a controller unit, coupled to said first and said second storing means as well as said communication means and which incorporates said third storing means, for temporarily changing said specific protocol used by said portable electronic device during communication in response to a protocol type selection command input from said external device, where said specific protocol is changed by modifying the stored contents of said third storing means, and for changing said specific protocol used by said portable electronic device at the time of start of communication in response to an initial data updating command, where said specific protocol for use at the time of start of communication is changed by modifying the stored contents of said second storing means.

2. A portable electronic device according to claim 1, further comprising:
   means for updating the prescribed information stored in said second storing means in accordance with a command delivered from the external device.

3. A portable electronic device according to claim 1, wherein said second storing means includes:
   a first area for storing first prescribed information used to determine whether only one protocol is designated as said specific protocol; and
   a second area for storing second prescribed information used to check said one protocol when only one protocol is designated as said specific protocol.

4. A portable electronic device according to claim 1, wherein said controller unit includes means for determining whether said specific protocol is designated by only one protocol and for generating a determining result based on that determination, where said determining result is made in accordance with said prescribed information stored in said second storing means; and
   said communication means includes means for sending data representing each of said different communication protocols which are to be used for the communication with said external device, where said data is sent based on said determining result generated by said determining means.

5. A portable electronic device according to claim 4, wherein said second storing means includes:
   a third area for storing priority order information with respect to a priority of each of said different communication protocols; and
   said communicating means includes means for sending said priority order information as well as said different communication protocols to said external device, in accordance with said determining result provided by said determining means.

6. A portable electronic device according to claim 1, further comprising:
   means for determining that only one of said communication protocols is to be used for said communication performed by said communication means.

7. A system formed of portable electronic devices each optionally connected to an external device, each portable electronic device comprising:
   first storing means for storing software programs respectively using different communication protocols;
   second storing means for storing prescribed information serving to discriminate a specific protocol which is to be used by the portable electronic device at the time of start of a communication with the external device;
   third storing means, coupled with said first and second storing means, for storing said specific protocol when communication is started;
   communication means for communicating with said external device based on one of said software programs stored in said first storing means, said software program corresponding to said specific protocol stored in said third storing means; and
   a controller unit, coupled to said first and said second storing means as well as said communication means and which incorporates said third storing means, for temporarily changing said specific protocol used by said portable electronic device during communication in response to a protocol type selection command input from said external device, where said specific protocol is changed by modifying the stored contents of said third storing means, and for changing said specific protocol used by said portable electronic device at the time of start of communication in response to an initial data updating command, where said specific protocol for use at the time of start of communication is changed modifying the stored contents of said second storing means.

8. A portable electronic device to be used with an external device, comprising:

storing means for storing a plurality of communication protocols to be used for a communication between said portable electronic device and said external device, each protocol having a priority associated therewith;

determining means, coupled with said storing means, for determining whether the portable electronic device supports at least two of the stored protocols, and providing a determining result based on that determination for indicating which protocol will be used for said communication, thereby allowing a lower priority protocol to be used before a higher priority protocol;

selecting means, coupled with said determination means, for selecting a protocol based on said determining result; and means, coupled with said selecting means, for communicating with said external device using said selected protocol.

9. A device according to claim 8, wherein said determining means is provided with:

means for specifying a predetermined one of the communication protocols so as to supply the determinating result when the portable electronic device supports only one of the communication protocols.

10. A device according to claim 9, further comprising:

second storing means for storing information for specifying the predetermined one of the communication protocols.

11. A device according to claim 10, further comprising:

means for updating the specifying information stored in said second storing means.

12. A device according to claim 8, wherein said determining means is provided with:

means for setting an order of priorities of the plurality of communication protocols, and supplying the determinating result in a sequence from the communication protocol having a higher priority to other communication protocol having a lower priority when the portable electronic device supports at least two of the plurality of communication protocols.

13. A device according to claim 12, wherein said determining means is provided with:

means for providing communication protocols having the lower priority in place of those having the higher priority as the determinating result.

14. A device according to claim 12, further comprising:

means for storing information for setting the order of priorities of the plurality of communication protocols.

15. A device according to claim 14, further comprising means for updating the information for setting the order of priorities.

16. A device according to claim 8, including an IC card, wherein the external device includes a terminal for performing read/write access of data to said IC card.

17. A portable electronic device comprising:

storing means for storing a plurality of communication protocols;

means for prioritizing said protocols including a first and subsequent priority corresponding to said stored protocols, said first and subsequent priorities being changeable;

means for selecting a protocol from said stored protocols based on said priorities associated therewith; and means for performing communication using said selected protocol.

* * * * *